United States Patent
Coon et al.

(10) Patent No.: US 7,169,344 B2
(45) Date of Patent: *Jan. 30, 2007

(54) METHOD OF REINFORCING AT LEAST A PORTION OF A STRUCTURE

(75) Inventors: Thomas Coon, Lapeer, MI (US); Michael Czaplicki, Rochester, MI (US)

(73) Assignee: L&L Products, Inc., Romeo, MI (US)

( * ) Notice: Subject to any disclaimer, the term of this patent is extended or adjusted under 35 U.S.C. 154(b) by 509 days.

This patent is subject to a terminal disclaimer.

(21) Appl. No.: 10/133,898

(22) Filed: Apr. 26, 2002

(65) Prior Publication Data

US 2003/0201572 A1  Oct. 30, 2003

(51) Int. Cl.
B29C 61/04 (2006.01)
B29C 65/66 (2006.01)

(52) U.S. Cl. .................................. 264/263; 264/267

(58) Field of Classification Search ............... 264/263, 264/266, 267, 343
See application file for complete search history.

(56) References Cited

U.S. PATENT DOCUMENTS

| | | | |
|---|---|---|---|
| 1,814,677 A | | 7/1931 | Fennema |
| 3,310,615 A | * | 3/1967 | Bender ................ 264/46.6 |
| 3,400,182 A | | 9/1968 | Kolt |
| 4,029,128 A | | 6/1977 | Yamagishi |
| 4,083,384 A | | 4/1978 | Horne et al. |
| 4,269,890 A | * | 5/1981 | Breitling et al. ........... 428/71 |
| 4,436,120 A | * | 3/1984 | Josien et al. .............. 138/93 |
| 4,451,518 A | | 5/1984 | Miura et al. |
| 4,463,870 A | | 8/1984 | Coburn, Jr. et al. |
| 4,610,836 A | | 9/1986 | Wycech |
| 4,695,343 A | | 9/1987 | Wycech |
| 4,732,806 A | | 3/1988 | Wycech |
| 4,751,249 A | | 6/1988 | Wycech |
| 4,769,391 A | | 9/1988 | Wycech |
| 4,810,548 A | | 3/1989 | Ligon, Sr. et al. |
| 4,813,690 A | | 3/1989 | Coburn, Jr. |
| 4,836,516 A | | 6/1989 | Wycech |

(Continued)

FOREIGN PATENT DOCUMENTS

CA  913319  10/1972

(Continued)

OTHER PUBLICATIONS

Copending U.S. Appl. No. 09/459,756, filed Dec. 10, 1999.

(Continued)

Primary Examiner—Edmund H. Lee
(74) Attorney, Agent, or Firm—Dobrusin & Thennisch PC

(57) ABSTRACT

A system and method for reinforcing at least a portion of a structural member, including at least one chamber or compartment having an interior portion which substantially conforms to the dimensions and geometry of the structural member being reinforced; and a reinforcement material for filling the interior portion of one or more of the compartments or chambers. The reinforcement material filling one or more of the compartments or chambers of the present invention can be a pumpable polymeric material, an heat activated expandable material, or a self-curing material. The compartment or chamber can be a polymeric material, such as nylon, which can be solid, blow-molded, flexible, or expandable depending upon the selected structural member to be reinforced.

36 Claims, 2 Drawing Sheets

U.S. PATENT DOCUMENTS

| | | |
|---|---|---|
| 4,853,270 A | 8/1989 | Wycech |
| 4,861,097 A | 8/1989 | Wycech |
| 4,901,500 A | 2/1990 | Wycech |
| 4,908,930 A | 3/1990 | Wycech |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,124,186 A | 6/1992 | Wycech |
| 5,194,199 A | 3/1993 | Thum |
| 5,266,133 A | 11/1993 | Hanley et al. |
| 5,358,397 A | 10/1994 | Ligon et al. |
| 5,373,027 A | 12/1994 | Hanley et al. |
| 5,506,025 A | 4/1996 | Otto et al. |
| 5,575,526 A | 11/1996 | Wycech |
| 5,725,272 A | 3/1998 | Jones |
| 5,755,486 A | 5/1998 | Wycech |
| 5,766,719 A | 6/1998 | Rimkus |
| 5,806,919 A | 9/1998 | Davies |
| 5,851,626 A | 12/1998 | McCorry et al. |
| 5,878,784 A | 3/1999 | Sales et al. |
| 5,884,960 A | 3/1999 | Wycech |
| 5,888,600 A | 3/1999 | Wycech |
| 5,894,071 A | 4/1999 | Merz et al. |
| 5,901,752 A | 5/1999 | Lundman |
| 5,931,474 A | 8/1999 | Chang et al. |
| 5,932,680 A | 8/1999 | Heider |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,053,210 A | 4/2000 | Chapman et al. |
| 6,068,424 A | 5/2000 | Wycech |
| 6,079,180 A | 6/2000 | Wycech |
| 6,092,864 A | 7/2000 | Wycech et al. |
| 6,096,403 A | 8/2000 | Wycech |
| 6,099,948 A | 8/2000 | Paver, Jr. |
| 6,103,341 A | 8/2000 | Barz et al. |
| 6,103,784 A | 8/2000 | Hilborn et al. |
| 6,131,897 A | 10/2000 | Barz et al. |
| 6,135,542 A | 10/2000 | Emmelmann et al. |
| 6,149,227 A | 11/2000 | Wycech |
| 6,150,428 A | 11/2000 | Hanely, IV et al. |
| 6,152,260 A * | 11/2000 | Eipper et al. ............... 181/296 |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche et al. |
| 6,199,940 B1 | 3/2001 | Hopton et al. |
| 6,207,244 B1 | 3/2001 | Hesch |
| 6,232,433 B1 | 5/2001 | Narayan |
| 6,233,826 B1 | 5/2001 | Wycech |
| 6,237,304 B1 | 5/2001 | Wycech |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,303,672 B1 | 10/2001 | Papalos et al. |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,348,513 B1 | 2/2002 | Hilborn et al. |
| 6,358,584 B1 | 3/2002 | Czaplicki |
| 6,368,438 B1 | 4/2002 | Chang et al. |
| 6,372,334 B1 | 4/2002 | Wycech |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| H2047 H | 9/2002 | Harrison et al. |
| 6,444,713 B1 | 9/2002 | Pachl et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B2 | 11/2002 | Barz |
| 6,474,723 B2 | 11/2002 | Czaplicki et al. |
| 6,475,577 B1 | 11/2002 | Hopton et al. |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,502,821 B2 | 1/2003 | Schneider |
| 6,519,854 B2 | 2/2003 | Blank |
| 6,523,857 B1 | 2/2003 | Hopton et al. |
| 6,523,884 B2 | 2/2003 | Czaplicki et al. |
| 6,546,693 B2 | 4/2003 | Wycech |
| 6,561,571 B1 | 5/2003 | Brennecke |
| 6,573,309 B1 | 6/2003 | Reitenbach et al. |
| 6,575,526 B2 | 6/2003 | Czaplicki et al. |
| 6,607,238 B2 | 8/2003 | Barz |
| 6,619,727 B1 | 9/2003 | Barz et al. |
| 6,620,501 B1 | 9/2003 | Kassa et al. |
| 6,634,698 B2 | 10/2003 | Kleino |
| 6,641,208 B2 | 11/2003 | Czaplicki et al. |
| 6,668,457 B1 | 12/2003 | Czaplicki |
| 6,691,468 B2 | 2/2004 | Helferty |
| 6,692,347 B1 | 2/2004 | Schneider |
| 6,708,979 B2 | 3/2004 | Stratman et al. |
| 6,729,425 B2 | 5/2004 | Schneider |
| 6,748,667 B2 | 6/2004 | Sevastian |
| 6,777,049 B2 | 8/2004 | Sheldon et al. |
| 6,786,533 B2 | 9/2004 | Bock et al. |
| 6,793,274 B2 | 9/2004 | Riley et al. |
| 6,811,864 B2 | 11/2004 | Czaplicki et al. |
| 6,820,923 B1 | 11/2004 | Bock |
| 6,846,559 B2 | 1/2005 | Czaplicki et al. |
| 6,851,232 B1 | 2/2005 | Schwegler |
| 6,855,652 B2 | 2/2005 | Hable et al. |
| 6,887,914 B2 | 5/2005 | Czaplicki et al. |
| 6,890,021 B2 | 5/2005 | Bock et al. |
| 6,905,745 B2 | 6/2005 | Sheldon et al. |
| 6,920,693 B2 | 7/2005 | Hankins et al. |
| 6,921,130 B2 | 7/2005 | Barz et al. |
| 6,923,499 B2 | 8/2005 | Wieber et al. |
| 6,928,736 B2 | 8/2005 | Czaplicki et al. |
| 6,938,947 B2 | 9/2005 | Barz et al. |
| 6,941,719 B2 | 9/2005 | Busseuil et al. |
| 6,953,219 B2 | 10/2005 | Lutz et al. |
| 6,955,593 B2 | 10/2005 | Lewis et al. |
| 2002/0053179 A1 | 5/2002 | Wycech |
| 2002/0054988 A1 | 5/2002 | Wycech |
| 2002/0066254 A1 | 6/2002 | Ebbinghaus |
| 2002/0074827 A1 | 6/2002 | Fitzgerald et al. |
| 2002/0164450 A1 | 11/2002 | Lupini et al. |
| 2003/0057737 A1 | 3/2003 | Bock et al. |
| 2003/0090129 A1 | 5/2003 | Riley et al. |
| 2003/0140671 A1 | 7/2003 | Lande et al. |
| 2003/0144409 A1 | 7/2003 | Kassa et al. |
| 2003/0176128 A1 | 9/2003 | Czaplicki et al. |
| 2003/0183317 A1 | 10/2003 | Czaplicki et al. |
| 2003/0186049 A1 | 10/2003 | Czaplicki et al. |
| 2004/0011282 A1 | 1/2004 | Myers et al. |

| | | | | | | |
|---|---|---|---|---|---|---|
| 2004/0074150 A1 | 4/2004 | Wycech | WO | WO 93/05103 | 3/1993 | |
| 2004/0079478 A1 | 4/2004 | Merz | WO | WO95/32110 | 11/1995 | |
| 2004/0135058 A1 | 7/2004 | Wycech | WO | WO97/02967 | 1/1997 | |
| 2004/0143969 A1 | 7/2004 | Czaplicki | WO | WO97/43501 | 11/1997 | |
| 2005/0058787 A1 | 3/2005 | Ishikawa et al. | WO | WO98/36944 | 8/1998 | |
| 2005/0081383 A1 | 4/2005 | Kosal et al. | WO | WO98/50221 | 11/1998 | |
| 2005/0082111 A1 | 4/2005 | Weber | WO | WO99/08854 | 2/1999 | |
| 2005/0102815 A1 | 5/2005 | Larsen | WO | WO99/28575 | 6/1999 | |
| 2005/0126286 A1 | 6/2005 | Hable et al. | WO | WO99/48746 | 9/1999 | |
| 2005/0127145 A1 | 6/2005 | Czaplicki et al. | WO | WO99/50057 | 10/1999 | |
| 2005/0159531 A1 | 7/2005 | Ferng | WO | WO 00/02747 | 1/2000 | |
| 2005/0166532 A1 | 8/2005 | Barz | WO | WO00/03894 | 1/2000 | |
| 2005/0172486 A1 | 8/2005 | Carlson et al. | WO | WO00/12571 | 3/2000 | |
| 2005/0194706 A1 | 9/2005 | Kosal et al. | WO | WO00/12595 | 3/2000 | |
| 2005/0212326 A1 | 9/2005 | Marion | WO | WO00/13876 | 3/2000 | |
| 2005/0212332 A1 | 9/2005 | Sheldon et al. | WO | WO00/13958 | 3/2000 | |
| 2005/0217785 A1 | 10/2005 | Hable et al. | WO | WO00/20483 | 4/2000 | |
| 2005/0218697 A1 | 10/2005 | Barz et al. | WO | WO00/27920 | 5/2000 | |
| 2005/0230165 A1 | 10/2005 | Thomas et al. | WO | WO 00/37239 | 6/2000 | |
| 2005/0241756 A1 | 11/2005 | Harthcock et al. | WO | WO 00/37241 | 6/2000 | |
| 2005/0251988 A1 | 11/2005 | Mendiboure | WO | WO00/37302 | 6/2000 | |
| 2005/0260399 A1 | 11/2005 | Finerman | WO | WO00/37554 | 6/2000 | |
| 2005/0268454 A1 | 12/2005 | White | WO | WO 00/38863 | 7/2000 | |
| 2005/0269840 A1 | 12/2005 | Finerman et al. | WO | WO00/39232 | 7/2000 | |
| 2005/0276970 A1 | 12/2005 | Busseuil et al. | WO | WO00/40815 | 7/2000 | |
| 2005/0285292 A1 | 12/2005 | Mendiboure et al. | WO | WO00/43254 | 7/2000 | |
| 2006/0000186 A1 | 1/2006 | Carlson et al. | WO | WO0040629 | 7/2000 | |
| 2006/0008615 A1 | 1/2006 | Muteau et al. | WO | WO00/52086 | 9/2000 | |
| | | | WO | WO00/55444 | 9/2000 | |

FOREIGN PATENT DOCUMENTS

| | | | | | |
|---|---|---|---|---|---|
| DE | 38 26 011 A1 | 2/1990 | WO | WO 00/68041 | 11/2000 |
| DE | 38 38 655 | 5/1990 | WO | WO 01/19667 | 3/2001 |
| DE | 40 28 895 C1 | 2/1992 | WO | WO00/46461 | 8/2001 |
| DE | 4039135 | 6/1992 | WO | WO01/54936 | 8/2001 |
| DE | 196 35 734 A1 | 4/1997 | WO | WO01/56845 | 8/2001 |
| DE | 196 48 164 A1 | 5/1998 | WO | WO01/71225 | 9/2001 |
| DE | 19812288 C1 | 5/1999 | WO | WO01/83206 | 11/2001 |
| DE | 299 04 705 U1 | 7/1999 | WO | WO 01/88033 A1 | 11/2001 |
| DE | 19856255 C1 | 1/2000 | WO | WO 03/042024 | 5/2003 |
| DE | 19858903 A1 | 6/2000 | WO | WO 03/047951 | 6/2003 |
| EP | 0 061 131 | 9/1982 | WO | WO 03/051676 | 6/2003 |
| EP | 0268416 | 5/1988 | WO | WO 03/061934 | 7/2003 |
| EP | 0611778 A3 | 8/1994 | WO | WO 03/089221 | 10/2003 |
| EP | 0 775 721 A1 | 5/1997 | WO | WO 03/093387 | 11/2003 |
| EP | 0891918 A1 | 1/1999 | WO | WO 05/077634 | 8/2005 |
| EP | 0893331 A1 | 1/1999 | WO | WO 05/105405 | 11/2005 |
| EP | 0893332 A1 | 1/1999 | WO | WO 05/113689 | 12/2005 |
| EP | 1 134 126 B1 | 3/2001 | | | |
| EP | 1 122 156 A2 | 8/2001 | | | |
| EP | 1 031 496 | 12/2001 | | | |
| EP | 0893332 B1 | 3/2002 | | | |
| EP | 1 208 954 A2 | 5/2002 | | | |
| EP | 1 362 683 | 11/2003 | | | |
| EP | 1 362 769 | 11/2003 | | | |
| EP | 1 428 744 | 6/2004 | | | |
| EP | 1 591 224 | 2/2005 | | | |
| FR | 2 539 693 | 7/1984 | | | |
| FR | 2539693 | 7/1984 | | | |
| FR | 2684633 | 6/1993 | | | |
| FR | 2 749 263 | 12/1997 | | | |
| GB | 2 061 196 A | 5/1981 | | | |
| GB | 2 375 328 A | 11/2002 | | | |
| GB | 2 401 349 | 11/2004 | | | |
| JP | 59-214628 | 12/1984 | | | |
| JP | 61-205109 | 9/1986 | | | |
| JP | 63-54217 | 3/1988 | | | |
| JP | 63-231913 | 9/1988 | | | |
| JP | 01069308 | 3/1989 | | | |
| JP | 01164867 | 6/1989 | | | |
| JP | 3-197743 | 8/1991 | | | |
| JP | 4-158009 | 6/1992 | | | |
| JP | 02001191949 A | 7/2001 | | | |

OTHER PUBLICATIONS

Copending U.S. Appl. No. 09/502,686, filed Feb. 11, 2000.
Copending U.S. Appl. No. 09/524,961, filed Mar. 14, 2000.
Copending U.S. Appl. No. 09/631,211, filed Aug. 3, 2000.
Copending U.S. Appl. No. 09/858,939, filed May 16, 2001.
Copending U.S. Appl. No. 09/655,965, filed Sep. 6, 2000.
Copending U.S. Appl. No. 09/676,335, filed Sep. 29, 2000.
Copending U.S. Appl. No. 09/676,725, filed Sep. 29, 2000.
Copending U.S. Appl. No. 09/859,126, filed May 16, 2001.
Copending U.S. Appl. No. 10/163,894, filed Jun. 4, 2002.
Copending U.S. Appl. No. 09/906,289, filed Jul. 16, 2001.
Copending U.S. Appl. No. 09/939,152, filed Aug. 24, 2001.
Copending U.S. Appl. No. 60/317,009, filed Sep. 4, 2001.
Copending U.S. Appl. No. 60/318,183, filed Sep. 7, 2001.
Copending U.S. Appl. No. 09/974,017, filed Oct. 10, 2001.
Copending U.S. Appl. No. 60/324,497, filed Sep. 24, 2001.
Copending U.S. Appl. No. 09/982,681, filed Oct. 18, 2001.
Copending U.S. Appl. No. 10/008,505, filed Nov. 8, 2001, which claims priority from European Application No. 0106911.1 filed Mar. 20, 2001.
Copending U.S. Appl. No. 10/008,194, filed Nov. 8, 2001, which claims priority from European Application No. 0111151.7 filed May 8, 2001.
Copending European Application No. 0130439.3 filed Dec. 20, 2001.

Copending U.S. Appl. No. 60/351,950, filed Jan. 25, 2002.
Copending U.S. Appl. No. 10/103,029, filed Mar. 21, 2002.
Copending U.S. Appl. No. 60/369,039, filed Mar. 29, 2002.
Copending U.S. Appl. No. 60/369,001, filed Apr. 1, 2002.
Copending U.S. Appl. No. 60/373,241, filed Apr. 17, 2002.
Copending U.S. Appl. No. 10/132,482, filed Apr. 25, 2002.
Copending U.S. Appl. No. 10/233,919, filed Sep. 3, 2002.
Copending U.S. Appl. No. 10/234,902, filed Sep. 4, 2002.
Copending U.S. Appl. No. 10/404,831, filed Apr. 1, 2003.

PCT International Search Report for International Application No. PCT/US01/18496.

Born et al.; Structural Bonding in Automotive Applications, Oct. 2004.

* cited by examiner

US 7,169,344 B2

METHOD OF REINFORCING AT LEAST A PORTION OF A STRUCTURE

FIELD OF THE INVENTION

The present invention relates to an insertable barrier or chamber system for reinforcing a portion of a structural member. More particularly, the present invention relates to a barrier and chamber system for placement or insertion within a structural member. The system comprises a least one insertable barrier member or chamber suitable for receiving and retaining a structural reinforcing material which may provide structural reinforcement, noise and vibration damping, sealing, stress-strain reduction, or other desired physical characteristics to the structural member, as well as any combination of the foregoing.

BACKGROUND OF THE INVENTION

Traditional barrier systems found in the prior art used for reinforcing a portion of a structural member having an open center have included a metal or rigid barrier member placed within the open center. In many instances, the structural nature of the barrier member limited the applications for which the barrier system could be used. For instance, the structure and location of the member being reinforced made it difficult to insert a barrier member therein after the structural member had been incorporated into a frame system, such as automobile frame or rail. For example, once an automobile has been completed or partially assembled, the insertion of a barrier member into the center portion of a cavity of a structural member is often difficult and time consuming. Thus, there is needed a system and method that will permit local reinforcement of a structure at various stages throughout the manufacturing or assembly process concerning the member being reinforced.

In addition, the prior art further employs a number of pumpable products or techniques for the placement of a reinforcing material within the selected structural member. Although this pumpable technology work well and is advantageous in many applications, the use of pumpable products in a manufacturing environment often creates additional maintenance and clean-up issues as well as inadvertent and unwanted placement or leakage of the pumpable products into undesirable areas of the structural member or the surrounding environment. Further, many structural members found in the automotive, aerospace, marine, appliance, and furniture industries require the physical presence of tooling holes, clips, push-pins, and other mechanical hardware or displacements formed within or on the structural member itself. Generally speaking, these holes, clips, push-pins, and other mechanical assemblies are needed for use in later steps of the manufacturing process. When the prior art pumpable products are introduced to such structural members, access to these holes, hardware, or displacements can become obstructed or blocked thereby causing disruptions to the manufacturing process which may also require the manual removal of unwanted material or deposits. Although prior techniques used to prevent such obstructions or blockages include physical masking of the holes, hardware, or displacements with tapes and other materials, the application and removal of masking techniques increase the complexity and length of the manufacturing process, create the potential that masking materials are inadvertently left on the structural member, and give rise to additional maintenance and clean-up issues in the manufacturing environment.

The present invention obviates and overcomes the drawbacks found in the prior art by providing a barrier and bladder system having at least one compartmentalized barrier or chamber that is formed to fit within the contours of an inner portion of the chosen structural member upon insertion into the structural member. The compartmentalized barrier or chamber may comprise a plurality of barriers or chambers which can be solid (i.e. a box-like insert), rigid, or may be a flexible or inflatable chamber having a variety of expansion volumes. The plurality of barriers or chambers of the present invention have an inner portion suitable and are suitable and capable of receiving a variety of materials, which may or may not be expandable or heat-activatable, that are pumped, placed, extruded, retained, or otherwise disposed within the barrier or chamber for structural reinforcement, damping, and/or sealing of the member without allowing unwanted spillage or leakage of the material to portions of the structural member such as tooling holes and other hardware needed in the manufacturing process.

SUMMARY OF THE INVENTION

The present invention is directed to a barrier or chamber system which can be inserted, placed, or mechanically retained within selected portions of a structural member to effectuate structural reinforcement, noise and vibration damping, and/or sealing without interfering with or comprising other portions of the member or the manufacturing assembly process. The system includes at least one barrier compartment or chamber, having an inner portion, which divides at least a portion of the structural member into one or more sections and a material for filling one or more barrier compartments or chambers. The barrier compartments or chambers of the present invention may be formed of a solid, rigid, flexible, or expandable material that may or may not have adhesive characteristics. For example, the barrier compartments or chambers may be formed as a solid structure, a blow molded part, an extruded part, a die-cut part, a "box" like retaining part that is placed within the structural member to be reinforced, or a "balloon" like part, which can conform and shape to the contours of an inner portion of the chosen structural member. The at least one compartment or chamber may comprise a polymeric material, such as nylon, an injection molded polymer, graphite, carbon, or a molded metal such as aluminum, magnesium, or titanium as well as an alloy derived from the materials or a foam derived from the materials or other metallic foam. Other more conventional materials that may comprise one or more of the compartments or chambers of the present invention include wood, wood composite materials, cardboard, pliable cardboard, thermoplastic materials, and other thermosetting materials. It is contemplated that the compartments or chambers could also comprise a flexible or expandable membrane that would volumetrically expand like a balloon upon the introduction of the expandable material. Such a membrane may consist of a thermosetting polymer with cure characteristics that may be activated in a variety of ways. For example heat, catalyst, or a combination of two or more chemically reactive ingredient may be used to activate the polymer.

In another important aspect of the present invention, the at least one barrier compartment or chamber will include at least one access hole or port for the placement or filling of an amount of a material into the inner portion of the selected compartment or chamber. The material may be introduced into the compartment or chamber through pumpable technology, extrusion technology, or mini-application bonding such as that set forth in commonly-owned U.S. Pat. No. 5,358,397 which is expressly incorporated by reference herein. The at least one barrier compartment or chamber may be further characterized as having at least one through-hole, which may also comprise the access hole, or other permeable opening in the compartment or chamber which allows targeted overflow, seepage, or placement of the material, which may or may not be expandable and/or heat-activatable, to exit the compartment and come into contact with an inner portion of the selected structural member, such as the automotive frame, rail, or other structural member typically utilized in automotive, aerospace, marine, appliance, and furniture products. Once the material is activated or cured, the material placed within the compartment or chamber is uniformally joined or linked with the material flowing from the through-hole and in contact with the inner portion of the structural member, thereby enhancing structural reinforcement of targeted and designated areas of the structural member.

The material disposed, placed, filled, extruded, or pumped into the compartment or chamber disclosed in the present invention may be cured at ambient temperatures found in a standard manufacturing environment, may be a self-curing material with or without a resulting exothermic reaction, may be capable of chemical activation depending upon application parameters, or may capable of expansion from 0–2000% when exposed to heat typically encountered in an automotive paint operation, such as e-coat and other paint cycles in a vehicle assembly plant. It is contemplated that the material disclosed in the present invention adheres within the compartment or chamber thereby structurally reinforcing and enhancing the strength and stiffness of compartment or chamber which is in contact with and follows the geometry and contours of an inner portion of the selected structural members, such as a frame, front rail, door pillar, lower hinge, and other portions of vehicles, appliances, and furniture products, to redirect applied loads and energy. In one embodiment, the material is heat expandable and at least partially fills the compartment or chamber and further flows into contact with an inner portion of the structural member through at least one through-hole in the exterior of the chamber in contact with the inner portion of the rail, frame, or selected portion of the vehicle by structurally adhering the rail and the frame to the chamber and the expandable material flowing from the through-hole during the ecoat bake operation.

In another embodiment, the material is a melt flowable material, which upon the application of heat will spread over a surface of the compartment or chamber or otherwise occupy the volume of the chamber. The selected material may also provide a variety of characteristics including structural reinforcement, stress-strain reduction, vibrational damping, noise reduction, or any combination thereof. However, it is contemplated that the material of the present invention need not be either expandable or heat-activatable, and may consist of self-curing material which reacts with or without an exothermic state to fill the selected compartment of chamber and reinforce the chosen structural member.

In yet another embodiment, the present invention further serves to reduce health, cleanliness, and maintenance issues encountered through the use of "wet" chemical technology in either a pre-assembly facility or a vehicle assembly plant since the material can be extruded, molded, placed, or filled, or "mini-application" bonded directly into the at least one barrier compartment or chamber in either a pre-production setting, such as a stamping facility, or during the final assembly operation. The compartment or chamber, and the material, can be installed or placed into an inner portion of the selected structural member prior to the e-coat or paint operation processing. Hence, the present invention provides flexibility in the manufacturing process since it can be utilized by either the manufacturer/supplier of the structural member, such as the frame, rail, pillar, or door assembly, or the final vehicle manufacturer with reduced labor, capitol expense, maintenance requirements, and floor space demand. Once the material bonds and/or cures within the barrier compartments or chambers placed within the inner portion of the structural members, distortion of the structural member may be inhibited or managed during an impact event or any other application of impact energy to the exterior of the vehicle.

The present invention is also directed to a method for using the insertable barrier and chamber reinforcement system. The method for reinforcing at least a portion of a structural member having either an open or closed center, includes the steps of providing a structure; supporting at least one barrier compartment or chamber along a portion of the structural member for dividing the area of the structural member into one or more sections; and filling one or more of the barrier compartments or chambers with a material through at least one access hole or port through an exterior portion of the compartment or chamber. In a further embodiment, the method may provide at least one through-hole disposed through the exterior or membrane of the barrier compartment or chamber which allows the egress of the material to exit the compartment or chamber and come into contact with inner portions of the structural member.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
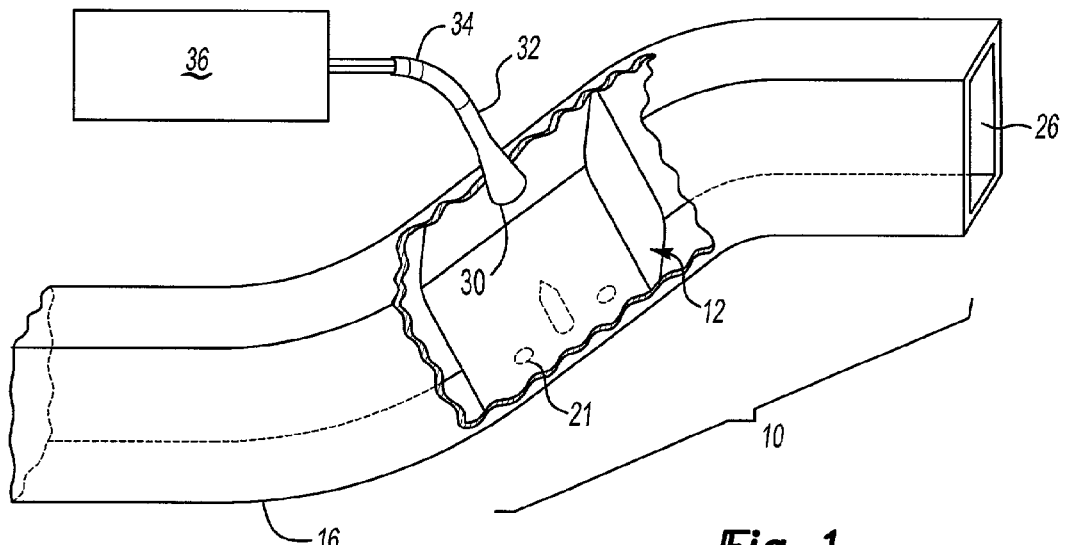
FIG. 1 is a cross-section showing the chamber system formed in accordance with the teachings of this invention placed in a longitudinal cavity.

The compartment or chamber reinforcement system of the present invention generally includes at least one barrier compartment or chamber and a reinforcing material retained by or within at least a portion of the barrier compartment or chamber. In general application, the system can be used to reinforce a portion of a structural member having either an open or closed center (i.e. hollow or non-hollow) by inserting a barrier compartment or chamber, or a plurality of modular barrier compartments or chambers, within the interior or along an inner portion of the structure or structural member to be reinforced. The at least one barrier compartment or chamber may be a solid structure for formed placement within the inner portion of a structural member or a flexible chamber capable of volumetric expansion which will generally come into contact with, and conform and shape to the geometry and dimensions of, the inner portion of the structural member. Most notably, the compartment or chamber can comprise a blow-molded, extruded, or flexible/expandable structure which can be configured in any shape, design, or thickness corresponding to the dimensions of the inner portion of the chosen structural member. Once the barrier compartment or chamber is in place within the structural member through physical placement, gravity placement, sealing material, adhesive material, mechanically retention means, or otherwise attached, affixed, or adhered to the structural member, a material such as a polymer-based liquid, solid or semi-solid material, is received, filled, or disposed into the barrier compartment or chamber through an access hole or port extending through the exterior portion or membrane of the compartment or chamber.

It is contemplated that the barrier compartment or chamber could comprise a nylon or other polymeric material as set forth in commonly owned U.S. Pat. No. 6,103,341, expressly incorporated by reference herein, as well as injection molded, extruded, blow-molded, reaction injection molded, die cast, or machined chamber comprising materials such as nylon, PBI, or PEI. The compartments or chambers may also be selected from materials consisting of extruded aluminum, aluminum foam, magnesium, magnesium alloys, molded magnesium alloys, titanium, titanium alloys, molded titanium alloys, polyurethanes, polyurethane composites, low density solid fillers, and formed SMC and BMC and may be further utilized with a sealant or adhesive disposed along an exterior portion of the compartment or chamber so that the compartment or chamber adheres to the chosen structural member and remain in a designated position. Still further, the member adapted for stiffening the structure to be reinforced could comprise a stamped and formed cold-rolled steel, a stamped and formed high strength low alloy steel, a roll formed cold rolled steel, or a roll formed high strength low alloy steel.

In a preferred embodiment, the system of the present invention can be used to reinforce a portion of a structural member having a hollow center. Alternatively, the present invention can be utilized to reinforce selected portions of a chosen structural member which may or may not have a hollow center. The barrier compartment or chamber is inserted or otherwise attached, affixed, or adhered to the open center of the chosen structural member and the expandable material is received in one or more of the chambers to effectuate reinforcement of the structural member.

FIGS. 1–5 show a cross-sectional view of a compartment and chamber system 10 formed in accordance with the teachings of this invention. The system 10 includes at least one chamber 12 occupying or defining a volume or space that is inserted, placed, or retained within a structural member 16 wherein a reinforcement material 14 is disposed, filled, pumped, or placed within the volume of the chamber 12, either before or after the chamber 12 is placed or inserted within the selected portion of the structural member 16 contemplated to be reinforced.

Figure 4:
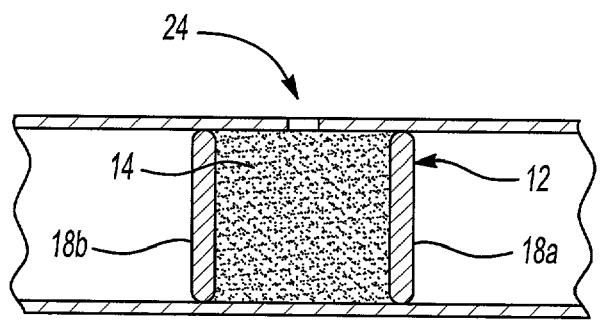
FIG. 4 illustrates another embodiment of a chamber reinforcement system formed in accordance with the teachings of this invention wherein the chamber is a box-like structure placed directly within the structural member selected for reinforcement.
Figure 5A:
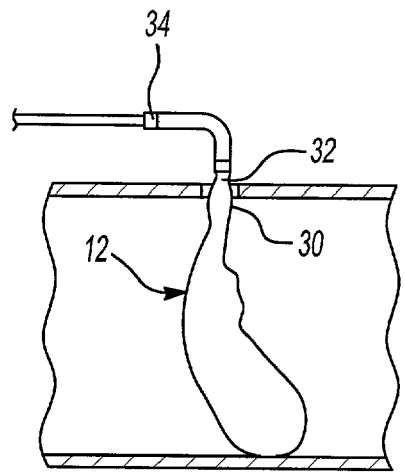
FIG. 5a shows the chamber member of this invention coupled to a fill valve suitable for receiving a structural material.
Figure 5B:
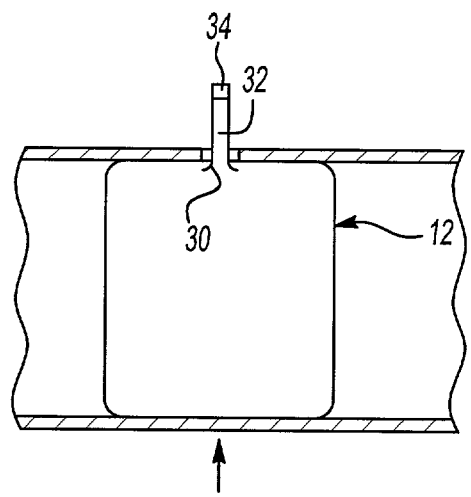
FIG. 5b shows the chamber member of FIG. 5a after receiving a structural material.

Turing now to the embodiment shown in FIG. 1, the compartment or chamber 12 can be a solid structure, such as a rigid box-like compartment, a blow-molded structure having an interior portion with a defined volume, or a flexible chamber having an interior portion which defines a volume or space that can be formed and shaped to conform with the geometric dimensions of an inner portion of the selected structural member 16 such as that shown in FIG. 4, or an inflatable, expandable bag-like chamber as shown in FIGS. 5a and 5b. One of skill in the art will appreciate that the structure of the expandable bag-like structure resembles that of a balloon as shown in FIGS. 5a and 5b. In the embodiment of FIG. 1, the compartment or chamber 12 includes a hollow center or portion which occupies a volume or space within a portion of the structural member 16 to be reinforced. The chamber may have a porous, flexible, solid, or rigid outer membrane or exterior portion. The outer membrane or exterior portion permits the compartment or chamber 12 to conform to the shape of the area being reinforced as defined by the inner portion and dimensions of the structural member 16. The chamber 12 may also include at least one optional access hole or port 30 for the ingress, intake, or introduction of a material 14, such as a structural material, pumpable material, a self-curing material, or an expandable material, into an interior portion of the compartment or chamber 12. The system of the present invention may further utilize an integral neck portion 32 having an end portion 34 for coupling the compartment or chamber 12 to an outside fluid pumping system 36 used in the manufacturing operation to fill an amount of reinforcement material 14 into the interior portion of the compartment or chamber 12. However, it will also be appreciated that the system 10 of the present invention also discloses at least one chamber 12 which is pre-filled with a reinforcement material 14, which may or may not be expandable or curable, for insertion and placement directly within a selected portion of the structural member 16.

The exterior portion of the compartment or chamber 12 can include at least one optional through-hole or perforations 21 located therein to allow the reinforcement material 14 to pass, overflow, seep, or bleed through the compartment or chamber 12 and come into contact and adhere to adjacent surfaces, such as the inner portion of the structural member 16. Alternatively, the exterior portion of the chamber 12 may be made of structural adhesive that is flexible, such that the chamber 12 itself would come into contact and adhere directly to the inner portion of the structural member 16.

Figure 2:
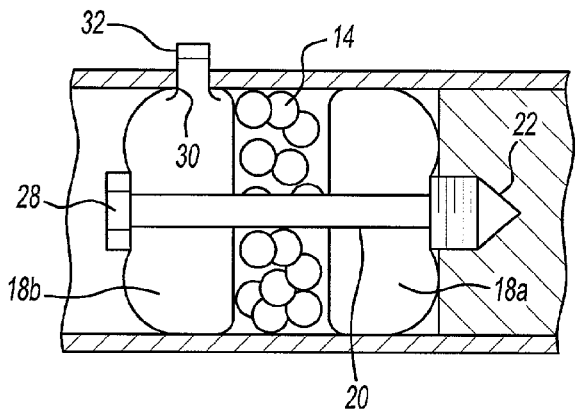
FIG. 2 illustrates another embodiment of a chamber reinforcement system formed in accordance with the teachings of this invention, wherein the structural material is undergoing curing.

FIG. 2 shows another embodiment of the system 10. In this embodiment, the chamber 12 is a two-piece movable structure. Each movable portion 18a, 18b is supported by a rod 20. One end of the rod 20 supports a pin head 30 and the opposite end supports a nut 22 or other similar device.

FIG. 4 shows still another embodiment of the chamber 12 of the system 10 of the present invention. In this embodiment, the at least one chamber 12 is a box-like structure capable of receiving a reinforcement material 14.

The above described embodiments of the barrier compartment or chamber 12 merely illustrate the various forms in which the barrier compartment or chamber 12 can be constructed. One of ordinary skill in the art will appreciate that many other configurations and constructions of the barrier compartment or chamber 12 may be used in practicing the invention. For instance, the barrier compartment or chamber 12 could be a reservoir for retaining the material 14 within defined portions of a structural member 16, or the compartment or chamber 12 could be used to meter/control flow of the material 14 past the boundary of the compartment or chamber 12 to allow the material 14 to come into contact and adhere with targeted areas of the inner portion of the structural member.

As set forth herein, the barrier compartment or chamber 12 of the present invention can be a polymeric material such as an elastomer, polyethylene, ethylene-vinyl acetate copolymer, plasticized polyvinyl chloride film, polyamide, or various olfenic copolymer or terpolymer materials. One of skill in the art will appreciate that the system 10 can be used for a wide variety of applications for a variety of transportation and consumer related products that can benefit from structural reinforcement. Thus, the choice of material selected to comprise the barrier compartment or chamber 12 will depend upon the environmental conditions under which the barrier compartment or chamber 12 will be used, including how the chamber will be inserted and retained within the chosen structural member 16.

In a particular embodiment, the barrier compartment or chamber 12 can be used to reinforce a portion of a structural member found in automotive vehicles, such as an automobile frame or rail, during initial assembly of the vehicle or in the automobile after market in body or paint shop applications during repair operations. In the aforementioned applications, the barrier compartment or chamber 12 can be exposed to temperatures ranging from approximately 93° C. (200° F.) to approximately 204° C. (400° F.). In still another embodiment, the barrier compartment or chamber 12 can be used in low temperature operations, including applications at subzero temperatures. Thus, the material selected for forming the barrier compartment or chamber 12 should possess thermal properties that will permit the barrier compartment or chamber 12 to maintain its structural integrity at a predetermined temperature or over a predetermined temperature range.

One of skill in the art will also appreciate that the size and specific physical dimensions of the barrier compartment or chamber 12 will vary depending on the physical dimensions of the area to be reinforced.

Turning now to a discussion of the material 14 for use in the present invention, the material 14 can be any material that can be dispensed as a liquid, solid, or semi-solid material and later reacted or cured to create a substantially fused member. The material 14 can be processed and dispensed into the barrier compartment or chamber 12 as a liquid prepolymer or a thermoplastic material before curing, and in one embodiment, after curing the material 14 can become thermoset. The preferred material is a polymeric material, with the most preferred material being a polymeric material that becomes thermoset after curing. Materials that can be used to form the material 14 include, but are not limited to, epoxy, polyurethane, polyester, and acrylic based materials, which when compounded with appropriate ingredients may expand and cure in a reliable and predictable manner upon application of a curing stimulus. One of skill in the art will appreciate that various olfenic materials, elastomers, fluropolymers or other materials may be used to formulate the material 14.

A number of epoxy-based structural reinforcing foams are known in the art and may also be used to produce the material 14 of the present invention. A typical structural foam includes a polymeric base material, such as an epoxy resin or ethylene-based polymer which, when compounded with appropriate ingredients (typically a blowing agent, a curing agent, and perhaps a filler), typically expands and cures in a reliable and predictable manner upon the application of heat or another activation stimulus. The resulting material has a low density and sufficient stiffness to impart desired rigidity to a supported article. From a chemical standpoint for a thermally-activated material, the structural foam is usually initially processed as a thermoplastic material before curing. After curing, the structural foam typically becomes a thermoset material that is fixed and incapable of flowing.

The material 14 is generally and preferably a heat-activated epoxy-based resin having foamable characteristics upon activation through the use of heat typically encountered in an e-coat or other automotive paint oven operation. As the material 14 is exposed to heat, it generally expands, cross-links, and structurally bonds to adjacent surfaces. An example of a preferred formulation is an epoxy-based material that may include polymer modificis such as an ethylene copolymer or terpolymer that is commercially available from L&L Products, Inc. of Romeo, Mich., under the designations L-5204, L-5206, L-5207, L-5208, L-5209, L-5214, and L-5222. One advantage of the preferred structural foam materials over prior art materials is the preferred materials can be processed in several ways. Possible processing techniques for the preferred materials include injection molding, blow molding, thermoforming, direct deposition of pelletized materials, extrusion or extrusion with a mini-applicator extruder. This enables the creation of part designs that exceed the design flexibility capability of most prior art materials. In essence, any foamable material that imparts structural reinforcement characteristics may be used in conjunction with the present invention. The choice of the material used 14 will be dictated by performance requirements and economics of the specific application and requirements and may not necessarily include a heat-activated expandable material. Generally speaking, these automotive vehicle applications may utilize technology and processes such as those disclosed in U.S. Pat. Nos. 4,922,596, 4,978, 562, 5,124,186, and 5,884,960 and commonly owned, co-pending U.S. application Ser. No. 09/502,686 filed Feb. 11, 2000, Ser. No. 09/524,961 filed Mar. 14, 2000, 60/223,667 filed Aug. 7, 2000, 60/225,126 filed Aug. 14, 2000, Ser. No. 09/676,443 filed Sep. 29, 2000, Ser. No. 09/676,335 filed Sep. 29, 2000, Ser. No. 09/676,725 filed Sep. 29, 2000, and particularly, Ser. No. 09/459,756 filed Dec. 10, 1999, all of which are expressly incorporated by reference.

Additional foamable or expandable materials that could be utilized in the present invention include other materials which are suitable as bonding, energy absorbing, or acoustic media and which may be heat activated foams which generally activate and expand to fill a desired cavity or occupy a desired space or function when exposed to temperatures typically encountered in automotive e-coat curing ovens and other paint operation ovens. Though other heat-activated materials are possible, a preferred heat activated material is an expandable or flowable polymeric formulation, and preferably one that can activate to foam, flow, adhere, or otherwise change states when exposed to the heating operation of a typical automotive assembly painting operation. For example, without limitation, in one embodiment, the polymeric foamable material may comprise an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foamable formulations commercially available include polymer-based materials available from L&L Products, Inc. of Romeo, Mich., under the designations as L-2018, L-2105, L-2100, L-7005, L-7101, L-7102, L-2411, L-2420, L-4141, etc. and may comprise either open or closed cell polymeric base material.

Further, it is contemplated that the material 14 of the present invention may comprise acoustical damping properties which, when activated through the application of heat, can also assist in the reduction of vibration and noise in the overall automotive chassis, frame, rail, and/or body of the vehicle. In this regard, the now reinforced and vibrationally damped frame or front rail will have increased stiffness which will reduce natural frequencies, that resonate through the automotive chassis thereby reducing transmission, blocking or absorbing noise through the use of the conjunctive acoustic product. By increasing the stiffness and rigidity of the frame or front rail, the amplitude and frequency of the overall noise/vibration that occurs from the operation of the vehicle and is transmitted through the vehicle can be reduced.

Although the use of such impact absorbing materials and members are directed to structural members such as an automotive frame or rail, it is contemplated that the present invention can be utilized in other areas of an automotive vehicles that are used to ensure ingress and egress capability to the vehicle by both passengers as well as cargo, such as closures, fenders, roof systems, and body-in-white (BIW) applications which are well known in the art.

In addition to the use of an acoustically damping material within the barrier compartment or chamber 12, the present invention could comprise the use of a combination of an acoustically damping material and a structurally reinforcing expandable material along different portions or zones of a plurality of chambers 12 disposed within an inner portion of a structural member 16 depending upon the requirements of the desired application. Use of acoustic expandable materials in conjunction with structural material may provide additional structural improvement but primarily would be incorporated to improve NVH characteristics.

While several materials for fabricating the material 14 have been disclosed, the material can be formed of other materials provided that the material selected is heat-activated or otherwise activated by an ambient condition (e.g. conductive materials, welding applications, moisture, pressure, time or the like) and expands in a predictable and reliable manner under appropriate conditions for the selected application. One such material is the epoxy based resin disclosed in U.S. patent application Ser. No. 09/268,810, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, polyurethane materials with high glass transition temperatures, and mixtures or composites that may include even metallic foams such as an aluminum foam composition. See also, U.S. Pat. Nos. 5,766,719; 5,755,486; 5,575,526; 5,932,680 (incorporated herein by reference). In general, the desired characteristics of the expandable material 14 include high stiffness, high strength, high glass transition temperature (typically greater than 70 degrees Celsius), and good adhesion retention, particularly in the presence of corrosive or high humidity environments.

In applications where a heat activated, thermally expanding material is employed, an important consideration involved with the selection and formulation of the material comprising the structural foam is the temperature at which a material reaction or expansion, and possibly curing, will take place. In most applications, it is undesirable for the material to activate at room temperature or the ambient temperature in a production line environment. More typically, the structural foam becomes reactive at higher processing temperatures, such as those encountered in an automobile assembly plant, when the foam is processed along with the automobile components at elevated temperatures. While temperatures encountered in an automobile assembly body shop ovens may be in the range of 148.89° C. to 204.44° C. (300° F. to 400° F.), and paint shop oven temps are commonly about 93.33° C. (215° F.) or higher. If needed, various blowing agent activators can be incorporated into the composition to cause expansion at different temperatures outside the above ranges.

Generally, prior art expandable acoustic foams have a range of expansion ranging from approximately 100 to over 1000 percent. The level of expansion of the material may be increased to as high as 1500 percent or more, but is typically between 0% and 300%. In general, higher expansion will produce materials with lower strength and stiffness properties.

It is also contemplated that the material 14 could be delivered and placed into contact with the barrier compartment or chamber 12 of the present invention through a variety of delivery systems which include, but are not limited to, pumpable systems. For example, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In another embodiment, the material 14 is provided in an encapsulated or partially encapsulated form, which may comprise a pellet, which includes an expandable foamable material, encapsulated or partially encapsulated in an adhesive shell, which could then be attached or deposited within the chamber 12 in a desired configuration. An example of one such system is disclosed in commonly owned, co-pending U.S. application Ser. No. 09/524,298 ("Expandable Pre-Formed Plug"), hereby incorporated by reference. In addition, preformed patterns may also be employed such as those made by extruding a sheet (having a flat or contoured surface) and then die cut in accordance with a predetermined configuration.

Once introduced and placed within the barrier compartment or chamber 12, the material 14 found in the present invention can be cured by reacting two or more materials that possess chemically reactive functional groups. As discussed above, reaction can also be achieved by heating the material 14 to a desired temperature, heating the material 14 over a desired temperature range or by exposing the material 14 to a predetermined change in ambient conditions. For example, the material 14 can be cured by an induction heating application or by exposure to ambient conditions resulting in a change in atmospheric moisture conditions. In one embodiment, the material 14 can be a thermally activated compound such that it expands upon exposure to a predetermined temperature.

As the material 14 is cured, typically it expands to fill the area, or at least a portion of the area, to which it has been applied, in this case the barrier compartment or chambers 12 of the present invention. Although this expansion provides structural benefits, it is not necessary. The material 14 is formulated to permit the material 14 to adhere to adjacent surfaces. For example, it is contemplated that an expandable material 14 will activate to expand and exit the at least one perforation or through-hole 30 found in the chambers 12 of the present invention to come into contact and adhere to the inner portion of the structural member 16. The adhesion and physical properties of the expandable material 14 are similar to that of known structural foams and other similar compounds known in the art.

As the material 14 can be cured or caused to become chemically reactive upon exposure to certain environment and ambient conditions, an important consideration in selecting and formulating the material comprising the material 14 is the temperature at which a chemical reaction or expansion, and possibly curing will take place. For instance, in most applications, it is undesirable for the material 14 to become reactive unless triggered by combination of reactive components, application of heat, etc. As previously discussed, the expandable material 14 can be used in an automobile assembly plant or a body shop where it can be exposed to temperatures typically ranging from approximately 93° C. (200° F.) to approximately 204° C. (400° F.).

Upon curing, the strength and stiffness of the material 14 are increased and the material is no longer capable of flowing. The strength and stiffness of the cured material help to increase the structural properties of article retaining the expandable material 14 without significantly adding to the overall weight of the article. Additionally, in the cured state, the material 14, can have a density that does not add significantly to the weight of the article being reinforced.

Figure 3:
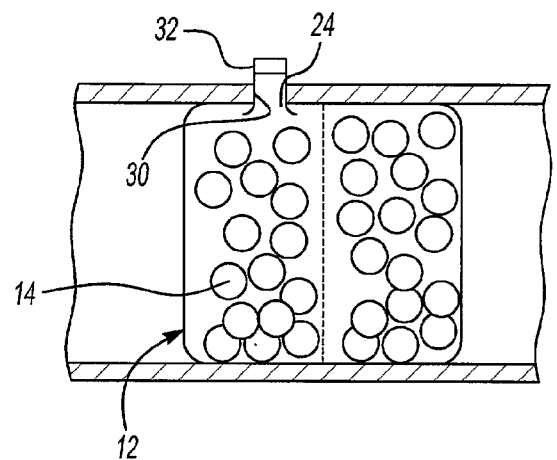
FIG. 3 shows the chamber system of FIG. 2 prior to curing the reinforcement material.

Typically, the material 14 is applied to the at least one barrier compartment or chamber 12 that has been pre-positioned, inserted, or placed to provide reinforcement at a desired point of reinforcement. In one embodiment, the material 14 is part of a system capable of being pumped into the barrier compartment or chamber 12 as shown at FIGS. 1–3. The pumping system can be of a type that is capable of dispensing the specific formulation of the expandable material 14 to the chamber at the site of reinforcement. Pumping systems that can be used to accomplish this task include, but are not limited to, two-part static mix dispensing machines, two-part dynamic mixing machines, impingement systems, and pressurized material dispensing vessels. One of skill in the art will appreciate that pumping systems of the type used in dispensing paint, adhesive, and thermosetting polymer products can be used to dispense the expandable material 14 into the at least one barrier compartment or chamber placed within the selected structural member. It will also be apparent to one of skill in the art that the type of dispensing machine chosen will depend on the nature of the chemical reaction required to cure the expandable material 14.

Use of the Chamber System

The system 10 of the present invention can be used to reinforce a structural member or other space or portion of an automotive or aerospace vehicle having either an open or closed center. Where the system 10 is used with a structural member 16 having a closed center, the method for using the system 10 can include supporting at least one barrier compartment or chamber 12 having a sealable interior portion defining a volume or space along a portion of the structural member 16 for dividing the area of the structural member into one or more sections and filling the interior portion of one or more of the chambers 12 with a material 14 through at least one access hole or port 30 located on the exterior surface of the chamber 12.

A similar method can be used in employing the system 10 to reinforce a portion of a structural member 16 having a hollow center. For example, the steps for reinforcing a structure having a hollow center can include inserting at least one barrier compartment or chamber 12 having a sealable interior portion within the cavity (hollow center) of the structural member 16 for dividing the cavity into one or more sections and filling the interior portion of at least one or more of the chambers 12 with an material 14 through at least one access hole or port 30 located on the exterior surface of the chamber 12. In addition, the chamber 12 selected for reinforcing a structural member 16 having either an open or closed center may further include at least one perforation or through-hole 21 extending through an exterior portion of the chamber 12 which allows overflow, seepage, or egress of material 14 to extend outwardly from the interior portion of the chamber 12 through the through-hole 21 and into contact with an inner portion of the structural member 16 where it may cure.

The embodiments shown in FIGS. 1–5 show use of the system 10 to reinforce a structure having an open center. Referring to the embodiment of FIG. 1, a structure or structural member 16 having a hollow center 26 is provided. An opening 24 (best seen in FIGS. 3 and 4) is formed in a surface of the structural member 16. The chamber 12 is inserted into the hollow center 26 by collapsing the sidewalls of the barrier compartment or chamber 12 and forcing the compartment or chamber 12 through the opening 24 such that the neck portion 32 and access hole or port 30 of the at least one barrier compartment or chamber 12 projects outwardly from the opening 24.

As shown in FIG. 1, a fluid pumping system 36 may be coupled to the open end 34 of the neck portion 32 of the chamber 12 permitting a fluid under pressure, such as a reinforcement material 14 to fill the interior portion of the chamber 12. As the selected fluid or reinforcement material 14 fills the interior portion of the chamber 12, the chamber 12 then expands to occupy a space in the structural member 16 and to fit the contours and geometry of the structural member 16. This action, as shown in FIGS. 5a and 5b, causes the area of the structural member 16 bounded by the at least one chamber 12 to be divided into one or more distinct sections for targeted structural reinforcement, noise/vibrational damping, sealing, stress-strain reduction, or a combination thereof.

The material 14 can be either pumped or injected, using known techniques, into one or more of the interior portions of the barrier compartment or chamber 12 through the access hole or port 30. A pump system 36 can be placed in the opening 24 adjacent the neck portion 32 and the access hole 30 to the barrier compartment 12. The material 14, in liquid or pellet form, is pumped into the interior portion of the compartment or chamber 12, as shown in FIG. 1. Alternatively, the material 14 may be placed or disposed within the compartment or chamber 12 prior to placement of chamber 12 within the structural member 16.

In the embodiment shown in FIG. 1, the exterior portion of the chamber 12 is capable of adhering to, or forming a seal with a surface of the structural member 16 to be reinforced. At least one perforation or through-hole 21 may be utilized in the exterior portion of the compartment or chamber 12 to allow egress or overflow of material 14 into contact with the portions of the structural member 16 itself. In this embodiment, the material 14 is pumped directly into the chamber 12, causing it to expand and conform to the dimensions of the inner portion of the structural member 16 as shown in FIG. 1.

In another embodiment shown at FIGS. 2 and 3, the chamber 12 can have a construction similar to that shown in FIG. 1, except the chamber 12 is inserted into the hollow center 26 of the structural member 16 from an open end of the structural member 16. The neck portion 32 of the compartment or chamber 12 extends along the length of the structural member 16 and is integrally formed as part of an end portion 18a of the compartment or chamber 12.

The end portion 18a may also support a second neck portion, which is placed in fluid communication with the portion of the hollow center 26 bounded by the compartment or chamber 12. As previously described, a fluid under pressure, such as the material 14, is pumped into the interior portion of the compartment or chamber 12 through the neck portion 32 and the access hole or port 30, causing the compartment or chamber 12 to expand and fill a portion of the hollow center 26. Once the compartment or chamber 12 has been inflated and conforms to the size, shape, and dimensions of an inner portion, the reinforcement material 14 may be cured to structurally reinforce the selected member 16.

In still another embodiment, the material 14 in the form of precast pellets is pumped into the barrier compartment 12. As the pellets are cured or caused to become chemically active, the pellets expand, causing the chamber to inflate or expand to fit the contours of the selected portion of the structural member 16.

In any of the embodiments discussed above, it will also be appreciated by one of skill in the art that it is possible that the reaction exotherm of the material 14 during the curing process could cause the barrier compartment or chamber 12 to melt and thereby either bond directly to the inner surface of the structural member 16 or displace to permit adhesion of the material 14 directly to the inner portion of the chosen structural member 16.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A method of reinforcing at least a portion of a structure, the method comprising:
   providing a structural member;
   supporting at least one chamber along an inner portion of the structural member for dividing the inner portion into one or more sections, wherein the chamber defines a volume of open space;
   filling the open space of the chamber with an expandable material; and
   expanding the expandable material;
   wherein the chamber includes an exterior portion that conforms in geometry to the inner portion of the structural member prior to filling the chamber with the expandable material.

2. The method as defined in claim 1, wherein the structural member comprises an automotive structural frame member.

3. The method as defined in claim 1, wherein the chamber comprises polymeric material.

4. The method as defined in claim 1, wherein the exterior portion is fabricated of an adhesive material.

5. The method as defined in claim 1, wherein the chamber includes a neck portion for receiving the expandable material.

6. The method as defined in claim 1, wherein the chamber includes one or more through holes for targeted overflow, seepage, or placement of the expandable material.

7. The method as defined in claim 1, wherein the chamber comprises a rigid blow molded material.

8. The method as defined in claim 7, wherein the chamber comprises a box-like structure.

9. The method as defined in claim 1, wherein the chamber is compartmentalized and adapted for receiving two or more expandable materials.

10. The method as defined in claim 9, wherein at least one of the compartmentalized chambers is void or filled with material different than that of the expandable material.

11. The method as defined in claim 10, wherein the different material comprise at least one of noise damping, vibration damping, sealing, or stress-strain reduction characteristics.

12. The method as defined in claim 11, wherein the different material comprises a reinforcement material.

13. The method as defined in claim 11, wherein the different material comprises a polymeric material.

14. The method as defined in claim 1, wherein the expandable material filling the chamber is a heat activated material.

15. The method as defined in claim 14, wherein the expandable material filling the chamber comprises a multiplicity of pellets.

16. The method as defined in claim 15, wherein the multiplicity of pellets are activatable during temperatures encountered during e-coat or automotive paint operations.

17. The method as defined in claim 14, wherein the expandable material is placed in the chamber prior to insertion of the chamber into the structural member.

18. The method as defined in claim 17, wherein chamber is mechanically retained within the structural member.

19. The method as defined in claim 1, wherein the expandable material filling the chamber is cured by a change in ambient conditions.

20. The method as defined in claim 1, wherein the expandable material filling the chamber is cured by reacting two or more materials.

21. The method as defined in claim 1, wherein the expandable material filling the chamber is a pumpable material.

22. The method as defined in claim 1, wherein the expandable material, the chamber or both comprises a polymeric material.

23. The method as defined in claim 1, wherein the expandable material is a reinforcement material.

24. A method of reinforcing an automotive structural member, the method comprising:
   providing an automotive structural frame member having an inner portion;
   placing a molded polymer chamber in the inner portion for dividing the inner portion into one or more sections, wherein the chamber defines a volume of open space;
   filling the open space of the chamber with an expandable material that is activatable during an e-coat or paint operation; and
   activating the expandable material to expand within the chamber;
   wherein the chamber includes an exterior portion that conforms in geometry to the inner portion of the structural member prior to filling the chamber with the expandable material, and wherein upon activation of the expandable material the chamber becomes affixed to the inner portion of the frame member.

25. The method as defined in claim 24, wherein the chamber has an exterior portion fabricated of an adhesive material.

26. The method as defined in claim 24, wherein the chamber includes one or more through holes for targeted overflow, seepage, or placement of the expandable material.

27. The method as defined in claim 24, wherein the expandable material filling the chamber comprises a multiplicity of pellets.

28. The method as defined in claim 24, wherein the expandable material is placed in the chamber prior to insertion of the chamber into the structural frame member.

29. The method as defined in claim 24, wherein chamber is mechanically retained within the structural frame member.

30. The method as defined in claim 24, wherein the expandable material filling the chamber is a pumpable material.

31. The method as defined in claim 24, wherein the expandable material, the chamber or both comprises a polymeric material.

32. The method as defined in claim 31, wherein the chamber is compartmentalized and adapted for receiving two or more expandable materials.

33. The method as defined in claim 32, wherein at least one of the compartmentalized chambers is void or filled with material different than that of the expandable material.

34. The method as defined in claim 33, wherein the different material comprise at least one of noise damping, vibration damping, sealing, or stress-strain reduction characteristics.

35. The method as defined in claim 24, wherein the expandable material is a reinforcement material.

36. A method of reinforcing an automotive structural member, the method comprising:

providing an automotive structural frame member having an inner portion;

placing a chamber in the inner portion for dividing the inner portion into one or more sections, wherein the chamber includes one or more through holes and defines a volume of open space;

filling the open space of the chamber with a multiplicity of pellets that are activatable during an automotive e-coat or paint operation, wherein upon activation the pellets expand and seep through the one or more through holes to affix the chamber to the frame member; and activating the expandable material to exDand within the chamber;

wherein the chamber includes an exterior portion that conforms in geometry to the inner portion of the structural frame member prior to activation the multiplicity of pellets.

* * * * *

UNITED STATES PATENT AND TRADEMARK OFFICE
CERTIFICATE OF CORRECTION

PATENT NO. : 7,169,344 B2 Page 1 of 1
APPLICATION NO. : 10/133898
DATED : January 30, 2007
INVENTOR(S) : Thomas Coon et al.

It is certified that error appears in the above-identified patent and that said Letters Patent is hereby corrected as shown below:

Col. 16, line 19
 replace "exDand"
 with --expand--.

Signed and Sealed this

Seventeenth Day of April, 2007

JON W. DUDAS
*Director of the United States Patent and Trademark Office*